United States Patent [19]

Carn

[11] 3,771,809

[45] Nov. 13, 1973

[54] DEVICE FOR TRANSPORTING LOADS ON UNEVEN OR SHIFTING GROUND, AND ALSO FOR LAUNCHING SMALL BOATS

[76] Inventor: Patrick Carn, 81, rue de Benodet (Sud-Finistere), Quimper, France

[22] Filed: Nov. 15, 1971

[21] Appl. No.: 198,675

Related U.S. Application Data

[62] Division of Ser. No. 889,258, Dec. 30, 1969, abandoned.

[30] Foreign Application Priority Data
Dec. 31, 1968 France .......................... 68183060
June 13, 1969 France .......................... 6919812
Nov. 13, 1969 France .......................... 6939028

[52] U.S. Cl. ............ 280/47.13 B, 9/1 T, 280/47.18, 280/DIG. 7
[51] Int. Cl. .............................................. B60p 3/10
[58] Field of Search ............. 280/47.13 R, 47.13 B, 280/63, 414 R, 414 A, 104.5 A, 460, 47.18, DIG. 7; 9/1 T

[56] References Cited
UNITED STATES PATENTS

| | | | |
|---|---|---|---|
| 3,036,842 | 5/1962 | Elliott et al. .................... | 280/DIG. 7 |
| 3,004,771 | 10/1961 | Moore ............................ | 280/414 R |
| 2,889,945 | 6/1959 | Holsclaw ...................... | 280/414 R X |
| 2,509,736 | 5/1950 | Jaffa ............................. | 280/87.01 |
| 2,347,947 | 5/1944 | Hamilton .................. | 280/47.13 R X |
| 3,333,861 | 8/1967 | Hoffman ......................... | 9/1 T X |
| 3,387,859 | 6/1968 | McClellan ................... | 280/460 R X |
| 3,241,855 | 3/1966 | Kersey et al. .............. | 280/104.5 A |

FOREIGN PATENTS OR APPLICATIONS

| | | | |
|---|---|---|---|
| 1,033,408 | 4/1953 | France .................................. | 280/63 |
| 1,214,201 | 11/1959 | France ..................................... | 9/1 T |
| 1,128,552 | 9/1968 | Great Britain .................. | 280/414 R |

OTHER PUBLICATIONS

"Popular Mechanics," August 1958, p. 132.

Primary Examiner—Kenneth H. Betts
Assistant Examiner—Leslie J. Paperner
Attorney—John W. Behringer et al.

[57] ABSTRACT

The invention concerns a device for transporting loads on untreated, broken land such as uneven or shifting ground, and more particularly a device adapted for launching small boats.

1 Claim, 11 Drawing Figures

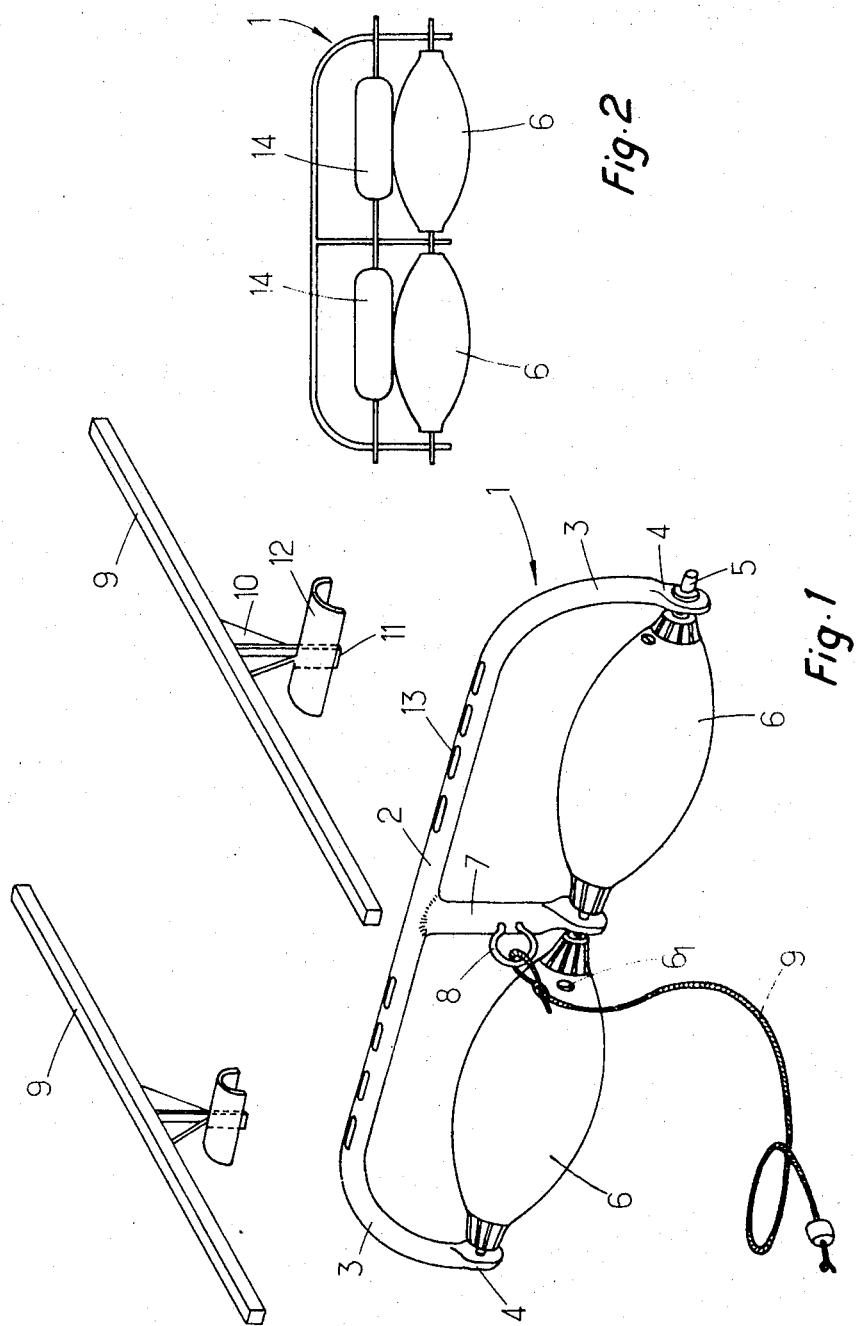

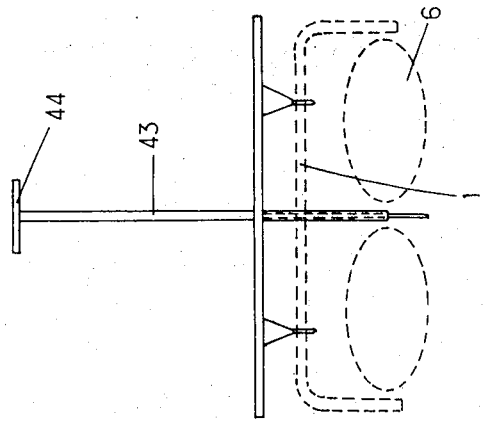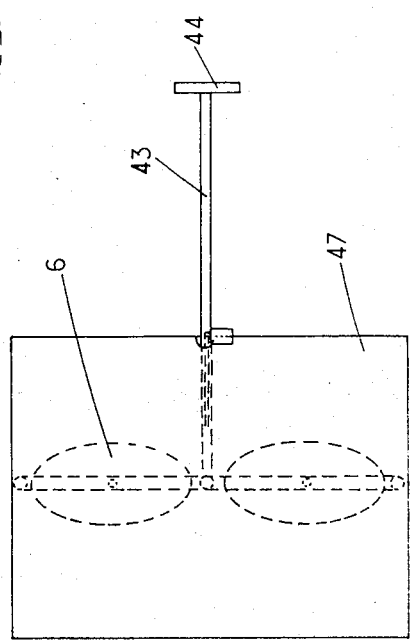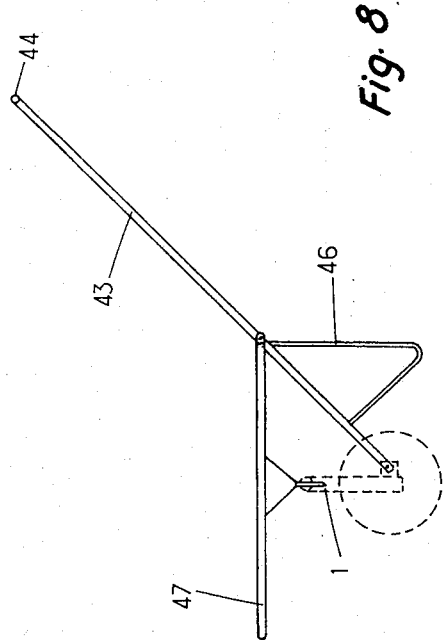

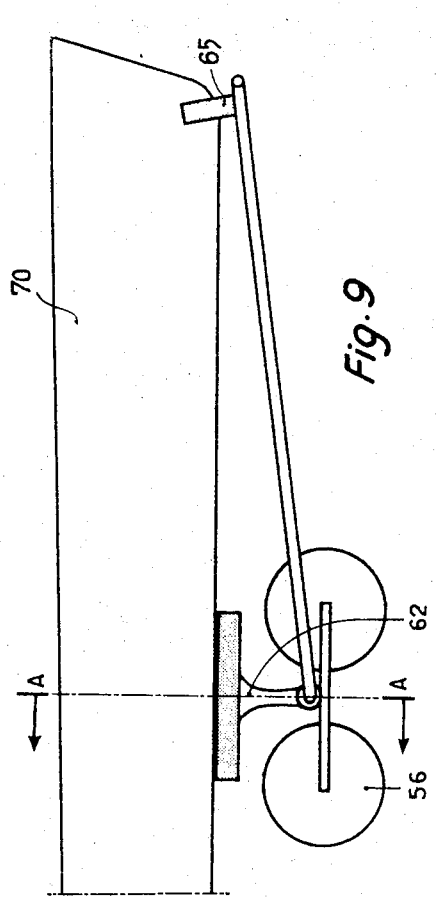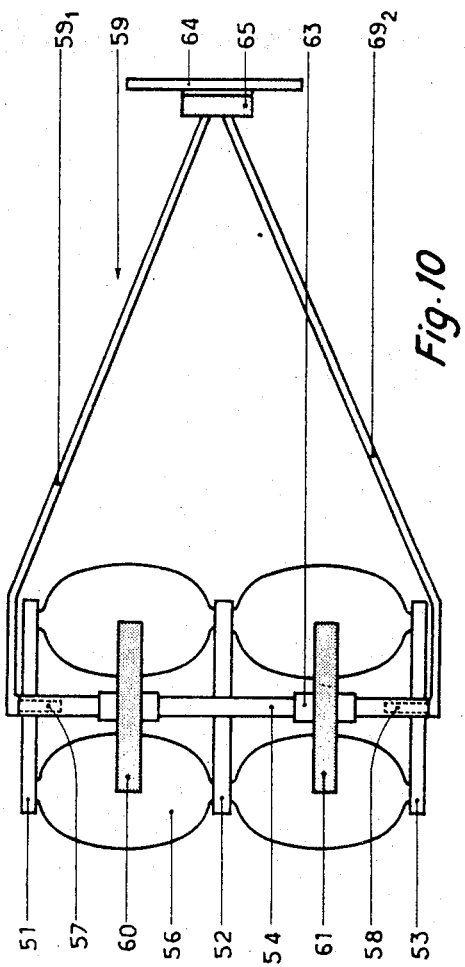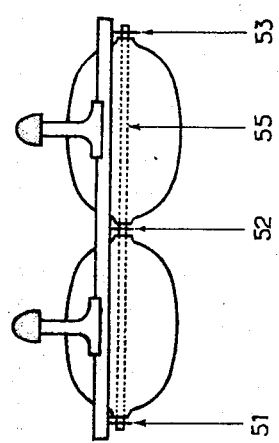

DEVICE FOR TRANSPORTING LOADS ON UNEVEN OR SHIFTING GROUND, AND ALSO FOR LAUNCHING SMALL BOATS

This is a division, of application Ser. No. 889,258, filed Dec. 30, 1969, now abandoned.

The invention concerns a device for transporting loads on untreated, broken land such as uneven or shifting ground, and more particularly a device adapted for launching small boats.

In accordance with the invention the device for transporting loads, especially small boats, is characterized by a supporting chassis equipped with adjustable means of support so that it can adapt to the conformation of the profile of the load to be transported, the said chassis being equipped with at least one pair of wheels wider than they are high, with a curved exterior bearing surface.

Other characteristics and production methods will be evident from the description, claims, and attached drawings in which:

FIG. 1 is a perspective view of one method of producing the invention.

FIG. 2 is a schematic cross-section of the device fitted with compensating rollers to avoid the deformation of the rollers which travel along the ground.

FIGS. 6, 7 and 8 are views showing a variation of the transportation device.

FIG. 9 is a side view of a variation of the device for transporting small boats.

FIG. 10 shows the device in accordance with FIG. 9, seen from above.

FIG. 11 is a cross-section view from A—A in FIG. 9.

Figure 3:
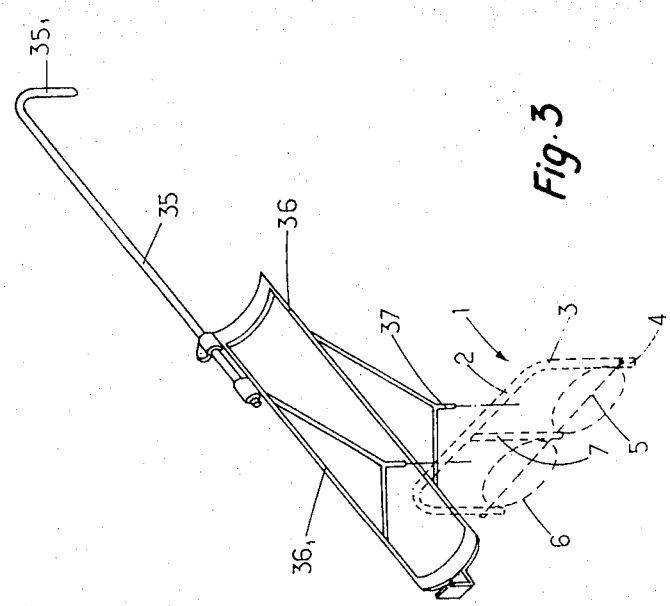
FIGS. 3, 4 and 5 show the transportation device fitted with adjustable means of support which permit the transportation of a load such as a golf bag.

As shown in FIG. 1, the device for transportation and for launching small boats in accordance with one production method is made up of a tubular chassis 1 comprising a rectilinear section 2 and two curved parts 3 whose ends 4 form pillow-blocks for an axle 5 which receives wheels 6 with a wide, curved exterior bearing surface.

In accordance with one production method, these wheels are of the low pressure, inflatable type and are fitted with an inflation valve $6_1$.

In the production method represented in FIGS. 1 and 2, a brace 7 is provided between the rectilinear part 2 of the chassis and the axle 5 of the inflatable wheels 6.

The brace 7 is fitted with a mooring ring intended to receive the end of a tow-rope 9, the chassis 1 being made in such a way that it can be shifted in a plane bordering approximately on the vertical.

The rectilinear section 2 of the chassis receives a pair of removable carriers 9 on which the bottom of the boat rests for transportation.

The removable carriers 9 are attached to the chassis 1 by simple interlocking; for this purpose each carrier comprises in its mid-part an iron fitting 10 ending in a flat piece 11 onto which a cradle 12 is slipped; this cradle straddles the rectilinear section 2 of the chassis, and keeps the carrier immobilized perpendicular to the said section of the chassis.

The iron fitting 11 engages in slots 13 made in the rectilinear section 2 of the chassis, several slots being provided along the length of the rectilinear section 2, permitting the distance between the carriers 9 to be adjusted according to the width of the boat to be shifted.

After use, the carriers 9 can be uncoupled from their sockets and stored parallel to the rectilinear section of the chassis, thus taking up little space for transportation of the device, for example in the trunk of an automobile.

The chassis 1 is tubular and the group comprising chassis, carriers and wheels with a wide exterior bearing surface is made of a material which can be immersed in fresh or salt water without being damaged, and this makes the operations of launching or taking boats from the water particularly simple.

In the production method represented in FIG. 2, the chassis 1 is fitted with a pair of rigid supporting rollers 14 positioned between the chassis 1 and the wheels with a wide, curved exterior bearing surface 6, in such a way that the exterior bearing surfaces of the rollers 14 are in contact with the wheels with a curved, wide exterior bearing surface 6; this permits, on the one hand, the reduction of strain on the pillow-blocks of the wheels 6 when the transportation device is loaded and, on the other hand, the reduction of unsymmetrical deformations caused by the unevenness of the ground.

In this production method, the rotation axle of the wheels with a wide exterior bearing surface can move vertically in the oblong slots provided at the extremities of the chassis 1, a slot also being provided at the extremity of the brace 7, so that the group comprising axle and wheels with a wide exterior bearing surface can move vertically depending on the load supported; this allows the weight of the boat to be carried back on the upper axle whilst at the same time absorbing elastically the unevenness of the ground without unsymmetrical deformation of the rollers 6.

In the production methods of FIGS. 3 thru 8, the device is applied solely to the shifting of loads on any sort of land. In the production method of FIGS. 3 thru 5, the device is more particularly designed for transporting golfing equipment.

This device is made up of a tubular chassis 1 comprising a rectilinear section 2 and two curved parts 3 whose ends 4 form pillow-blocks for an axle 5 which receives wheels 6 with a wide, curved exterior bearing tread.

The axle 5 receives the wheels 6 in such a way that the latter carry along the rotating axle simultaneously when the transportation device moves in a straight line, but also in such a way that the wheels 6 can turn independently around the axle, in either direction, when the transportation device changes direction.

In this production method, a brace 7 is provided between the rectilinear part 2 of the chassis and the axle 5 of the inflatable wheels 6.

In accordance with one characteristic, as shown in FIGS. 3 thru 11, the chassis is fitted with a rigid shaft which is fixed or articulated so that the load transported can be guided with precision.

In the production example shown in FIGS. 3 thru 8, the rigid shaft 35 is fixed to the chassis thru the intermediary of a cradle 36 constituting a means of support; this cradle 36 is fixed by support rods 37 onto the rectilinear part 2 of the chassis 1, so that the longitudinal axis of the cradle 36 is perpendicular to the rectilinear part 2 of the chassis 1.

The rigid shaft 35 terminates in a curved handle $35_1$ which affords a firm manual grip.

The shaft 35 can slide in relation to the side-member $36_1$ of the supporting cradle, so that it can occupy two positions in particular, one merging with the plane of the said cradle and corresponding to a position taking up little space, the other in the prolongation of the side-member 36₁ so that it constitutes a support for maneuvering.

Figure 4:
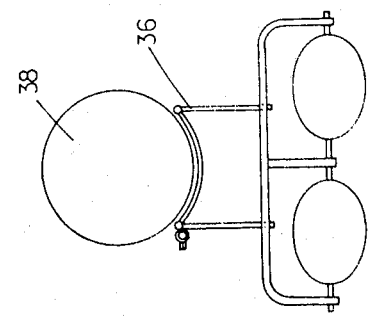

As illustrated in FIG. 4, the cradle 36 is particularly well adapted for transporting cylindrical-shaped loads 38 or similar items such as, for example, golf bags, etc.

Figure 5:
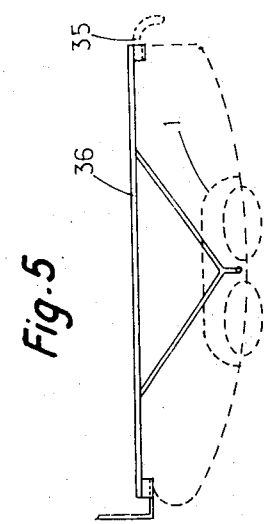

FIG. 5 shows in its least bulky state the transportation device, comprising the cradle 36, the chassis 1 and the rigid shaft 35.

This assembly can easily be transported in the trunk of a vehicle, and is set up in a few moments to roll on shifting or uneven ground, or furthermore turf, so that, in the latter case, there is no risk of spoiling turfed ground, for example golf courses, thanks to the wheels with a wide, curved exterior bearing surface.

In the production example illustrated in FIGS. 6 thru 8, the chassis 1 receives, as in the preceding examples, a rigid shaft 43 terminating in a handle 44.

The shaft 43 and the chassis 1 receive a tub or a platform 47. The shaft 43 receives a stabilization stand 46.

In accordance with another production method illustrated in FIGS. 9 thru 11, the transportation device is more particularly intended for moving small boats on uneven ground, whether solid or shifting.

For this purpose, the wheels of the chassis of the device are wider than they are high; these wheels are of the inflatable type and present a curved exterior bearing surface.

The chassis of the transportation device is made up of three parallel side-members 51, 52, 53, joined at their mid-points to a tubular cross-piece 54.

The side-members illustrated in FIG. 11 are made of T-shaped beams the ends of whose vertical legs are pierced to form pillow-blocks through which is passed the axle 55 bearing the wheels 56 with a wide, curved exterior bearing surface.

The chassis thus comprises two pairs of wheels having their axles at the ends of the side-members 51, 52, 53.

The cross-piece 54 is advantageously tubular and of circular section, so that the ends of the said cross-piece serve as pillow-blocks for the axles 57, 58 of a towing-bar 59, in such a way that the side-members form with the cross-piece 54 a balance-bar which can swing around the axles 57, 58.

The chassis and its wheels can thus follow the roughness of ground thanks to the possibility for the chassis to swing.

The chassis, in accordance with the first production method, is equipped with load supports in the form of carriers 60, 61 which can be strengthened with a resilient protective covering or something similar.

The carriers are joined to the cross-piece 54 of the chassis by means of legs 62 having at their end near the chassis a semi-circular pillow-block 63 which follows the curved profile of the cross-piece 54, so that the carriers and supporting legs together can swing around the cross-piece 54.

The carriers rest on the cross-piece 54 by simple interlocking of the pillow-blocks 63, whose spacing on the cross-piece 54 can be adjusted, depending on the dimensions of the load transported, as in the first production method.

The towing-bar 59 is made up of two bars 59₁, 59₂ which engage by simple interlocking inside the tubular section at the end of the cross-piece 54.

The bars 59₁, 59₂ are placed edge to edge with a traction bar 64 and joined to it.

A supporting pad 65 is provided around the traction bar 64, intended to receive the fore-part of the stem of a boat 70.

For transportation purposes, the carriers 60, 61 and the towing-bar 59 are uncoupled.

To put the transportation device into service, the chassis is placed under the stem of the boat 70 and, lifting the stern, the boat is pushed so that it rolls on the wheels with a wide, curved exterior bearing surface. When the boat's centre of gravity lies between the four wheels, one side of the boat is raised and it is rested on a carrier which has been placed into position. The same procedure is followed on the other side of the boat. The spacing of the carriers on the transversal tube 54 depends on the shape of the boat. The towing-bar is then put into position, the stem of the boat rests on the front supporting pad 65, and transportation can be effected by holding the bar on the towing-bar.

I claim:

1. A device for the transport of small boats comprising:
    a. two pairs of load-bearing wheels,
    b. each of said wheels inflatable, elliptical in profile and having its axial length the major axis of the ellipsis,
    c. each pair of wheels mounted on a separate axle,
    d. said first and second axle in parallel alignment,
    e. three side members in parallel alignment,
    f. said side members being journaled at their extremities at respectively the left end of the axles, the center of the axles between said wheels and the right end of the axles,
    g. a cross piece having a circular cross section spanning said side members and rigidly attached to the center of each side member,
    h. a pair of upstanding support legs, each of said legs having at its lower end a semi-circular pillow block,
    i. said legs attached to said circular cross piece by mounting said pillow blocks on said circular cross piece,
    j. longitudinally extending load supports extending from the top of said legs,
    k. a bifurcated towing bar having ends journaled at each end of said cross piece,
    l. a forward load support at the front of said pivoted towing bar.

* * * * *